United States Patent

[11] 3,569,739

[72] Inventor Steven D. Stolman
North Bergen, N.J. 07047
[21] Appl. No. 691,376
[22] Filed Dec. 18, 1967
[45] Patented Mar. 9, 1971
[73] Assignee The Bendix Corporation

[54] VARIABLE LEVEL DETECTOR NETWORK HAVING CONSTANT PERCENTAGE HYSTERESIS
5 Claims, 1 Drawing Fig.

[52] U.S. Cl. .......... 307/235, 307/229, 328/146
[51] Int. Cl. .......... H03k 5/20
[50] Field of Search .......... 307/229, 235; 328/146—150

[56] References Cited
UNITED STATES PATENTS
2,773,981 12/1956 Goodall .......... 328/146X
3,416,004 12/1968 Taylor .......... 307/235

*Primary Examiner*—Donald D. Forrer
*Assistant Examiner*—John Zazworsky
*Attorneys*—Anthony F. Cuoco and Plante, Hartz, Smith and Thompson

ABSTRACT: A level detector network including means for comparing an unknown signal to a variable reference signal and switching means connected to the comparing means for affecting said means so that the output therefrom is at one logic level when the unknown signal is greater than the reference signal and at another logic level when the unknown signal is less than the reference signal. The device has a constant percentage voltage hysteresis, and which hysteresis is independent of the reference signal.

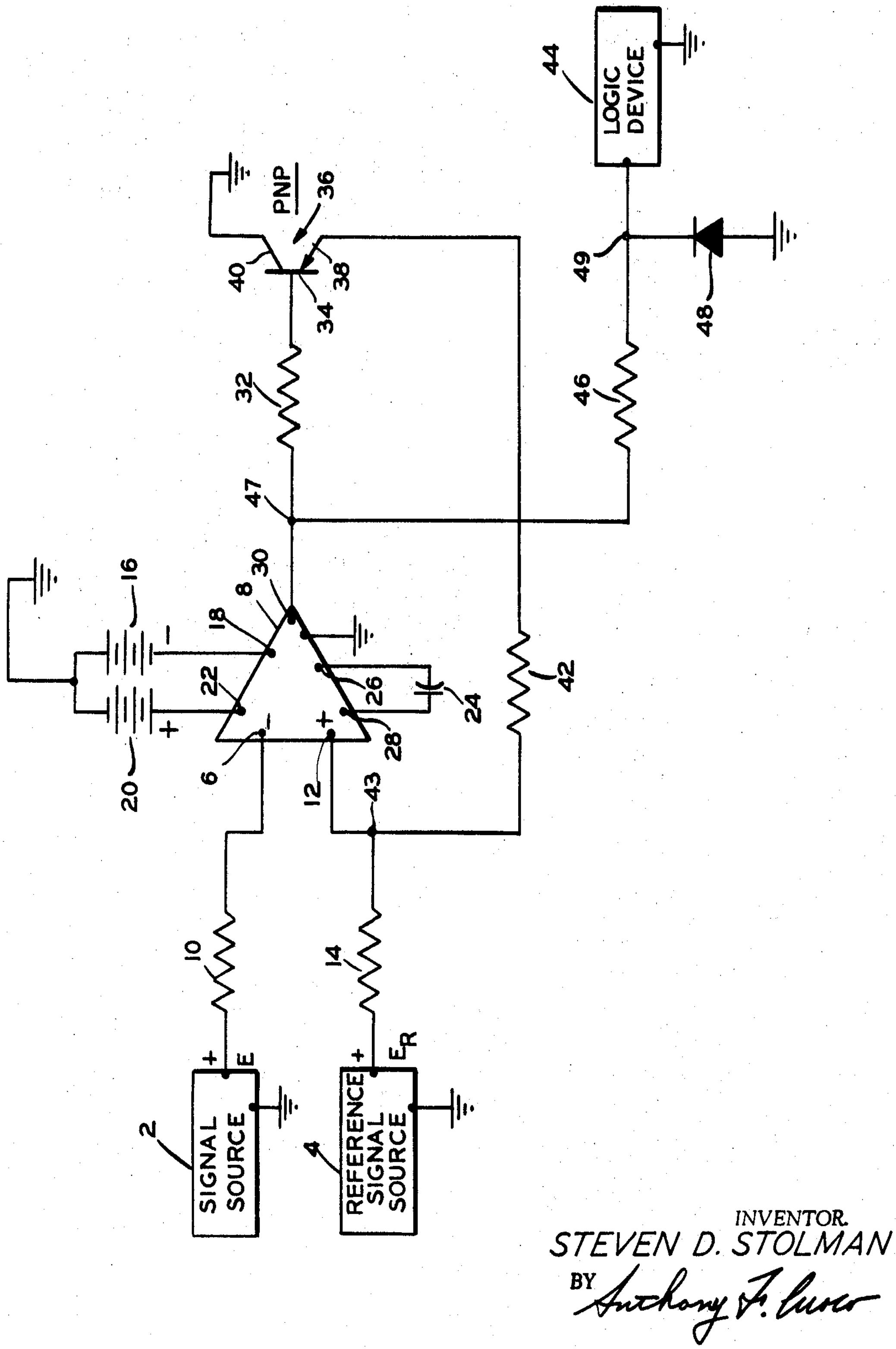
INVENTOR.
STEVEN D. STOLMAN
BY Anthony F. Cuoco
ATTORNEY

VARIABLE LEVEL DETECTOR NETWORK HAVING CONSTANT PERCENTAGE HYSTERESIS

BACKGROUND OF THE INVENTION

1. Field of the Invention

This invention relates to apparatus for detecting an unknown signal level relative to a reference signal level and, more particularly, to a signal level detector of the type described having constant percentage hysteresis.

2. Description of the Prior Art

Devices now known in the art for detecting the level of an unknown signal relative to the level of a reference signal have a fixed amount of voltage hysteresis. As the reference signal increases, the percentage hysteresis decreases proportionately. Such a phenomenon occurring over a wide signal range is undesirable. To insure proper functioning and adequate stability, with normal ripple and transients accompanying the unknown signal, a device with a constant percentage voltage hysteresis is desired.

SUMMARY OF THE INVENTION

The device of the present invention contemplates an operational amplifier connected to an unknown signal source and connected to a reference signal source. A transistor is connected in feedback configuration to the amplifier. When the unknown signal is less than the reference signal, the amplifier is at positive saturation. The transistor is effective for opening a path to ground and the amplifier provides an output at one logic level. When the unknown signal is greater than the reference signal, the amplifier is at negative saturation. The transistor closes the path to ground and the amplifier provides an output at another logic level.

One object of this invention is to provide a signal level detector having a constant percentage hysteresis.

Another object of this invention is to detect when an unknown signal is more or less than a reference signal.

Another object of this invention is to provide an output at one logic level when the unknown signal is less than the reference signal and to provide an output at another logic level when the unknown signal is greater than the reference signal.

Another object of this invention is to provide a level detector having relatively good stability over a wide signal range.

The foregoing and other objects and advantages of the invention will appear more fully hereinafter from a consideration of the detailed description which follows, taken together with the accompanying drawing wherein one embodiment of the invention is illustrated by way of example. It is to be expressly understood, however, that the drawing is for illustration purposes only and is not to be construed as defining the limits of the invention.

DESCRIPTION OF THE DRAWING

With reference to the single figure of the drawing which is an electrical schematic diagram of a device according to the invention, a signal source 2 provides a positive direct current or demodulated alternating current signal E such as may be used, for example, in an aircraft control system, and in which system it is necessary to determine the level of signal E relative to a positive direct current or demodulated alternating current variable reference signal $E_R$ provided by a reference signal source 4. Signal E is applied through a resistor 10 to an inverting input 6 of a high open loop gain, high input impedance operational amplifier 8 and reference signal $E_R$ is applied through a resistor 14 to a noninverting input 12 of amplifier 8. Resistor 14 represents the impedance of reference signal source 4.

A negative direct current power supply such as a battery 16 is connected to a power input 18 of operational amplifier 8 and a positive direct current power supply such as a battery 20 is connected to another power input 22 of amplifier 8. A frequency compensation capacitor 24 is connected to inputs 26 and 28 of operational amplifier 8.

An output 30 of operational amplifier 8 is connected through a resistor 32 to a base 34 of a PNP type switching transistor 36 having an emitter 38 and a grounded collector 40. Emitter 38 of transistor 36 is connected through a resistor 42 to a point 43 intermediate resistor 14 and noninverting input 12 of amplifier 8.

A logic device 44 which may, for purposes of example, be an aircraft navigational computer, is connected through a resistor 46 to a point 47 intermediate output 30 of amplifier 8 and resistor 32. A limiting diode 48 is connected to a point 49 intermediate resistor 46 and logic device 44.

OPERATION

When signal E from signal source 2 is less than signal $E_R$ from reference signal source 4, operational amplifier 8 is at its positive saturation level so as to provide at output 30 a signal corresponding to a logic "one," and which signal may be, for purposes of example, +11 volts. At this time transistor 36 is nonconductive and the path from emitter 38 of transistor 36 to ground is open with the voltage at input 12 of amplifier 8 being $E_R$.

When signal E increases so as to correspond approximately to signal $E_R$, amplifier 8 comes out of positive saturation and tends to go negative. In other words, signal $E_R$ is a triggering or "trip" signal for amplifier 8. Since amplifier 8 has a high open loop gain, signal E must exceed signal $E_R$ by approximately 1 millivolt before amplifier 8 goes negative.

As amplifier 8 goes negative, the resistance through transistor 36 from emitter 38 to ground decreases and a divider action occurs at input 12 of amplifier 8. After switching is completed; i.e. when amplifier 8 is at its negative saturation level so as to provide at output 30 a signal corresponding to a logic "zero" and which signal may, for purposes of example, be −11 volts, the path through emitter 38 is a good short to ground and the voltage $V_{12}$ at input 12 is as follows:

$$V_{12}=\frac{E_R\times R_{42}}{R_{42}+R_{14}} \qquad (1)$$

In this connection it is to be noted that in order for amplifier 8 to come out of negative saturation and tend to go positive, signal E from signal source 2 must correspond approximately to voltage $V_{12}$ and in this sense voltage $V_{12}$ is a release of "-drop-out" voltage for amplifier 8.

In accordance with the aforegoing, the hysteresis of the level detector of the present invention, i.e., the difference between the trip and release levels may be expressed as follows:

$$\text{percent hysteresis}=\frac{E_R-\frac{E_R\times R_{42}}{R_{42}+R_{14}}}{E_R}=1-\frac{R_{42}}{R_{42}+R_{14}} \qquad (2)$$

$$\text{percent hysteresis}=\frac{R_{14}}{R_{42}+R_{14}}$$

Thus, it may be seen from equation (2) that percentage hysteresis is a constant value and independent of reference voltage $E_R$.

If the requirement for most accuracy is at "drop-out," i.e. the point at which amplifier 8 comes out of negative saturation and tends to go positive, $R_{10}$ is made equal to the parallel combination of $R_{14}$ and $R_{42}$. If, instead, the requirement for more accuracy is at "pull-in" i.e., the point at which amplifier 8 comes out of positive saturation and tends to go negative, $R_{10}$ is made equal to $R_{14}$, with only a slight sacrifice in drop-out accuracy occurring due to current offset in amplifier 8.

In selecting a value for $R_{10}$ it must be understood that a bias current will flow from ground to each of the inputs 6 and 12 of amplifier 8, with the bias current being substantially equal at both inputs. Thus, in order to prevent input offset from affecting amplifier 8, it is desirable to maintain the resistance from inputs 6 and 12 to ground ($R_{10}$ and $R_{14}$, respectively) equal. It is obvious, then, that a decision must be made as to which condition is most critical; amplifier input offset or "pull-in" accuracy, and the choice of resistances must be made accordingly.

Transistor 36 when operated in inverted configuration as shown in the drawing serves as an excellent switch. For sufficiently negative voltages from amplifier 8, transistor 36 provides a short from emitter 38 to grounded collector 40, and for positive voltages from amplifier 8, transistor 36 is open. It is to be noted that the path from emitter 38 to collector 40 is open as is the path from emitter 38 to the base 34.

Although but a single embodiment of the invention has been illustrated and described in detail, it is to be expressly understood that the invention is not limited thereto, Various changes may also be made in the design and arrangement of the parts without departing from the spirit and scope of the invention as the same will now be understood by those skilled in the art. For example, with the addition of a difference amplifier providing the absolute difference between an unknown signal and a reference signal the device can function as a variable threshold comparator.

I claim:

1. A level detection network comprising:

A source of unknown signals corresponding to a condition;

A first resistor connected to said unknown signal source;

A source of reference signals;

A second resistor connected to the reference signal source;

An amplifier connected to the first and second resistors and responsive to the unknown and reference signals applied therethrough for becoming saturated in one sense when the unknown signal is less than the reference signal and for becoming saturated in another sense when the unknown signal is greater than the reference signal;

A current flow control device; and

A third resistor connecting the current flow control device in feedback relation to the amplifier for opening a path to ground when the amplifier is saturated in the one sense and for closing a path to ground when the amplifier is saturated in the other sense, with the percent hysteresis of the amplifier being constant and independent of the reference signal level and equal to the ratio of the second resistor to the sum of the second and third resistors.

2. A level detector as described by claim 1, wherein: the first resistor is equal to the parallel combination of the second resistor and the third resistor.

3. A level detector as described by claim 1, wherein: the first resistor is equal to the second resistor.

4. A level detector as described by claim 1, wherein:

the current flow control device is a transistor having base, emitter and collector elements;

the base element is connected to an output of the amplifier;

the emitter element is connected to an input of the amplifier; and the collector element is connected to ground.

5. A level detector as described by claim 1, wherein:

the amplifier has an inverting input and a noninverting input;

the unknown signal source is connected through the first resistor to the inverting input;

the reference signal source is connected through the second resistor to the noninverting input; and the current flow control device is connected through the third resistor to the noninverting input.